United States Patent
De Nunzio et al.

(10) Patent No.: US 10,690,506 B2
(45) Date of Patent: Jun. 23, 2020

(54) METHOD OF DETERMINING AN AREA REACHABLE BY A VEHICLE USING A DYNAMIC MODEL AND A LINE GRAPH

(71) Applicant: IFP Energies nouvelles, Rueil-Malmaison (FR)

(72) Inventors: Giovanni De Nunzio, Oullins (FR); Laurent Thibault, Lyons (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 306 days.

(21) Appl. No.: 15/896,232

(22) Filed: Feb. 14, 2018

(65) Prior Publication Data
US 2018/0231389 A1 Aug. 16, 2018

(30) Foreign Application Priority Data
Feb. 16, 2017 (FR) .................................. 17 51262

(51) Int. Cl.
*G01C 21/34* (2006.01)
*B60W 50/14* (2020.01)

(52) U.S. Cl.
CPC ......... *G01C 21/3446* (2013.01); *B60W 50/14* (2013.01); *G01C 21/3469* (2013.01); *B60K 2370/169* (2019.05); *B60W 2510/24* (2013.01); *B60W 2520/10* (2013.01); *B60W 2520/14* (2013.01); *B60W 2552/00* (2020.02); *B60W 2556/50* (2020.02); *B60W 2556/65* (2020.02); *G01C 21/3492* (2013.01); *Y02T 10/84* (2013.01)

(58) Field of Classification Search
CPC ............ G01C 21/3446; G01C 21/3469; G01C 21/3492; G01C 21/3697; B01C 21/367; B60W 50/14; B60W 2556/65; B60W 2556/50; B60W 2552/00; B60W 2520/10; B60W 2510/24; B60W 2510/14; B60K 2370/169; Y02T 10/84; G06F 16/29; G06F 30/20

See application file for complete search history.

(56) References Cited

U.S. PATENT DOCUMENTS

2009/0138188 A1* 5/2009 Kores ............... G01C 21/32
                                                        701/117
2013/0096818 A1  4/2013 Vicharelli et al.
2017/0297621 A1* 10/2017 Bunderson ........... G05D 1/0217
(Continued)

FOREIGN PATENT DOCUMENTS

DE   102012023632 A1   6/2014
EP        2669632 A2   12/2013
(Continued)

OTHER PUBLICATIONS

Preliminary Search Report dated Nov. 8, 2017 (3 Pages).
(Continued)

*Primary Examiner* — Mary Cheung
(74) *Attorney, Agent, or Firm* — Fitch, Even, Tabin & Flannery LLP

(57) ABSTRACT

The present invention relates to a method of determining at least one area (ZON) of a road network reachable by a vehicle driving on the road network. The method is based on the use of a dynamic model (MOD) of the vehicle depending on the vehicle speed and acceleration, the construction of a line graph (GA) and a shortest path algorithm (ALG).

23 Claims, 4 Drawing Sheets

(56) References Cited

U.S. PATENT DOCUMENTS

2017/0300049 A1\* 10/2017 Seally .................. G06Q 10/047
2018/0188043 A1\* 7/2018 Chen ..................... B60W 40/06

FOREIGN PATENT DOCUMENTS

WO          02/21078 A2    3/2002
WO    2014/001565 A1    1/2014

OTHER PUBLICATIONS

Rami Abousleiman et al: "A Bellman-Ford approach to energy efficient routing of electric vehicles" 2015 IEEE Transportation Electrification Conference and Expo (ITEC) (Jun. 1, 2015).

\* cited by examiner

METHOD OF DETERMINING AN AREA REACHABLE BY A VEHICLE USING A DYNAMIC MODEL AND A LINE GRAPH

CROSS REFERENCE TO RELATED APPLICATION

Reference is made to French patent application 17/51.262 filed on Feb. 16, 2017 which application is incorporated herein by reference in its entirety.

BACKGROUND OF THE INVENTION

Field of the Invention

The present invention relates to vehicle navigation and in particular to the field of prediction of a radius of action of a vehicle, which corresponds to the definition of positions reachable by the vehicle according to stored energy remaining within the vehicle.

Description of the Prior Art

According to the International Energy Agency, over 50% of the petroleum consumed worldwide is used by the transportation sector with, more than three quarters being for road transport. Again according to this agency, the transport sector is responsible for nearly a quarter (23.8%) of greenhouse gas emissions and for more than a quarter (27.9%) of $CO_2$ emissions in Europe in 2006.

It is therefore more important than ever to increase the energy efficiency of road travels in order to reduce the consumption of energy, whether the energy s fossil or electrical energy. Thus, Advanced Driver Assistance Systems (ADAS) represent a promising solution, both economical by (the driver's smartphone can simply be used) and non-intrusive (the mechanical components of the vehicle require no modifications).

Moreover, the increase in range of electric vehicles is a major challenge for the development thereof. Indeed, the low storage capacities of the batteries and the long recharging times make the use of electric vehicles complex and hinder the spread thereof. Moreover, these problems tend to limit even further the use of electric vehicles because the remaining battery life in kilometers of road actually displayed to the user is often not reliable. Therefore, electric vehicles with a low remaining capacity are often underused.

US published patent application 2015/127,204 relates to a device predicting the radius of action of a vehicle. However, the disclosed device does not describe the vehicle range computation method. It is therefore not guaranteed that the device disclosed in this document provides the radius of action of the vehicle in a reliable and precise manner.

US published patent application 2016/129,803 relates to a method of predicting the radius of action of a vehicle. However, the disclosed method does not account for the impact of the road and the infrastructure on the energy expenditure. The radius of action obtained with the method described in this document is therefore not reliable and precise.

US published patent application 2014/0,278,038 relates to a method of calculating the energy radius using an energy expenditure modeling approach and taking into account the maneuvers and of the impact of the infrastructure. However, this method requires a large memory for the computations. Indeed, this document provides a solution for saving map data in a form of an adjacency list, which requires a large memory. Furthermore, the method described in this published patent application overestimates the energy during acceleration phases by assuming that the engine power reaches its maximum value. Moreover, the method disclosed in this document does not provide a high level of precision. Indeed, this method is based on the assumption of a constant slope on an arc, which is a simplifying assumption that decreases the precision. Furthermore, this method uses a macroscopic approach based on the variation of the kinetic energy with the assumption of an inclusive efficiency.

SUMMARY OF THE INVENTION

In order to overcome these drawbacks, the present invention relates to a method of determining at least one area (radius of action) of a road network reachable by a vehicle driving on the road network. The method is based on the use of a dynamic model of the vehicle depending on the vehicle speed and acceleration, the construction of a line graph and a shortest path algorithm. The use of such a dynamic model and the construction of a line graph enable higher precision regarding the energy consumed, notably by taking accelerations into account, which allows precise determination of the radius of action. Furthermore, using a line graph allows significant reduction of the memory required for determination of the area. Thus, the method according to the invention allows more effective energy management, notably more effective management of the battery of an electric vehicle.

The invention relates to a method of determining at least one area of a road network reachable by a vehicle driving on the road network. For this method, the following steps are carried out:

a) identifying the position of the vehicle and an amount of energy stored in the vehicle;

b) constructing a dynamic model of the vehicle relating the energy being consumed by the vehicle to the speed and the acceleration of the vehicle, and to a slope profile of the road;

c) constructing a line graph of the road network around the identified position of the vehicle;

d) determining energy consumed by the vehicle for each arc of the line graph by use of the dynamic model of the vehicle and of an average speed of the vehicle travelling on the arc being considered, of the slope profile on the arc being considered are and of an acceleration of the vehicle to reach the average speed on the arc, and e) determining at least one area of the road network which is reachable by the vehicle with the amount of energy stored in the vehicle by use of a shortest path algorithm minimizing on the line graph the energy consumption, the shortest path algorithm being constrained by the amount of energy stored in the vehicle.

According to an embodiment, the average speed and the acceleration of the vehicle are determined by use of at least one of traffic conditions, topology and infrastructures of the road network.

Advantageously, the traffic conditions are obtained in real time through communication with online data services.

Alternatively, the traffic conditions are stored in historical data storage means.

According to an implementation, the line graph is constructed using the topology of the road network.

Advantageously, the topology of the road network is determined using geolocation means.

According to an embodiment option, the dynamic model of the vehicle depends on intrinsic parameters of the vehicle.

Preferably, the intrinsic parameters of the vehicle are obtained from a database or they are transmitted by a user.

According to an embodiment, the area is displayed on an autonomous device or on the dashboard of the vehicle.

According to a feature, the dynamic model of the vehicle depends on the power request of at least one auxiliary system of the vehicle.

Advantageously, the power request of at least one auxiliary system depends on the outside temperature.

Advantageously, the shortest path algorithm is a Bellman-Ford algorithm.

According to an implementation mode, the consumption of the vehicle is determined for at least one point of the area.

According to an embodiment, the line graph is constructed by carrying out the following steps:

i) constructing a directed graph of the road network with nodes and arcs, the nodes of the directed graph corresponding to the intersections of the road network, and the arcs of the directed graph corresponding to the roads connecting the intersections, and ii) constructing the line graph of the road network with nodes and arcs, the nodes of the line graph corresponding to the arcs of the directed graph and the arcs of the line graph corresponding to the adjacency of the arcs of the directed graph.

According to a feature, the vehicle is an electric vehicle and the amount of energy stored in the vehicle corresponds to the state of charge of the battery of the vehicle.

Furthermore, the invention relates to a method of managing the battery of a vehicle driving on a road network. For this method, the following steps are carried out:

a) determining at least one area of the road network reachable by the vehicle on the road network using the determination method according to one of the above features, and b) managing at least one of the use and the charge of the battery according to the reachable area.

Moreover, the invention relates to a computer program product stored on a tangible storage medium or a processor or server which executes program code instructions for implementing the method according to the invention, when the program is executed.

BRIEF DESCRIPTION OF THE DRAWINGS

Other features and advantages of the method according to the invention will be clear from reading the description hereafter of embodiments given by way of non limitative examples, with reference to the accompanying figures wherein.

DETAILED DESCRIPTION OF THE INVENTION

Figure 1:
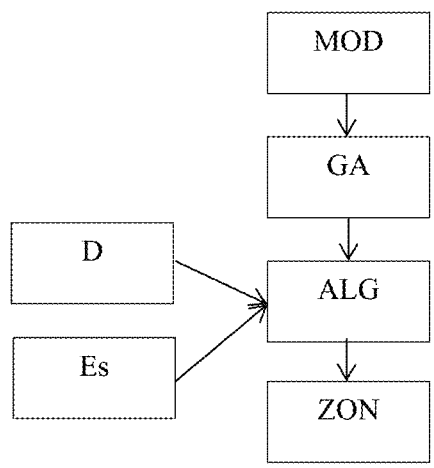
FIG. 1 illustrates the steps of the method according to a first embodiment of the invention.

The present invention relates to a method of predicting at least one area of a road network by a vehicle driving on the road network. In other words, the method according to the invention allows to determine the radius of action of a vehicle.

The method according to the invention is suited to any type of vehicle: combustion vehicles, hybrid vehicles, electric vehicles, etc.

NOTATIONS

The following notations are used in the description hereafter:

| | | |
|---|---|---|
| $v$ | Vehicle speed | (m/s) |
| $\chi$ | Vehicle position | (m) |
| $m$ | Vehicle mass | (kg) |
| $\omega$ | Vehicle engine speed | (rps) |
| $F_w$ | Vehicle traction force on the wheel | (N) |
| $F_{areo}$ | Aerodynamic force on the vehicle | (N) |
| $F_{friction}$ | Friction force undergone by the vehicle | (N) |
| $F_{slope}$ | Normal force undergone by the vehicle (gravity) | (N) |
| $F_{res}$ | Resultant of aerodynamic and rolling losses | (N) |
| $\alpha$ | Angle of inclination of the road | (rad) |
| $\rho_\alpha$ | Air density | (kg/m³) |
| $A_f$ | Frontal area of the vehicle | (m2) |
| $c_d$ | Aerodynamic drag coefficient | (—) |
| $c_r$ | Rolling resistance coefficient | (—) |
| $g$ | Gravitational acceleration | (m²/s) |
| $\alpha_0, \alpha_1$ and $\alpha_2$ | Vehicle parameters | (—) |
| $r$ | Wheel radius | (m) |
| $\rho_t$ | Vehicle transmission ratio | (—) |
| $\eta_t$ | Vehicle transmission efficiency | (—) |
| $T_m$ | Engine torque | (Nm) |
| $T_{m,max}$ | Maximum engine torque | (Nm) |
| $T_{m,min}$ | Minimum engine torque | (Nm) |
| $P_m$ | Power available at engine shaft | (W) |
| $P_b$ | Power demand at the battery | (W) |
| $\eta_b$ | Aggregate efficiency of the electric traction chain | (—) |
| $P_{aux}$ | Power of the vehicle auxiliaries | (W) |
| $T_{amb}$ | Ambient temperature | (K) |
| $i$ | Road segment I | (—) |
| $i-1$ | Road segment preceding road segment I | (—) |
| $\bar{v}$ | Average traffic speed | (m/s) |
| $K$ | Function | |
| $E_i$ | Energy consumption over segment I | (Wh) |
| $E_b$ | Energy consumption at the battery | (Wh) |
| $\bar{P}_i$ | Power of the vehicle on segment I at average speed | (W) |
| $\tilde{P}_i$ | Power of the vehicle on segment I at variable speed | (W) |
| $T_i$ | Travel time on segment I | (s) |
| $l_i$ | Length of segment I | (m) |
| $E_{jump,i}$ | Energy consumption associated with speed variation for segment I | (Wh) |
| $t_{jump,i}$ | Time required for speed variation for segment I | (s) |
| $W_k^*$ | Line graph arc weight | (Wh) |

For these notations, the time derivative is denoted by $$\frac{d}{dt}$$

or by a point above the variable considered.

The method according to the invention comprises the following steps:

1) vehicle position and amount of stored energy identification;

2) vehicle dynamic model construction;
3) line graph construction;
4) energy consumption determination on the line graph; and
5) reachable area determination.

The dynamic model construction and line graph construction steps can be carried out in this order, simultaneously or in the reverse order.

The method according to the invention can be carried out prior to the departure of the vehicle or while the vehicle is moving. Preferably, the method according to the invention is carried out in real time.

Thus, the method according to the invention enables more effective energy management, notably more effective management of the battery of an electric vehicle.

FIG. 1 schematically illustrates by way of non limitative example the steps of the method according to an embodiment of the invention.

1) position (D) and amount of stored energy (Es) identification
2) vehicle dynamic model (MOD) construction
3) line graph (GA) construction
4) energy consumption determination on the line graph, using the dynamic model (MOD) and the line graph (GA)
5) reachable area (ZON) determination by means of a shortest path algorithm (ALG) applied to the line graph (GA) constrained by the amount of stored energy (Es).

Figure 2:
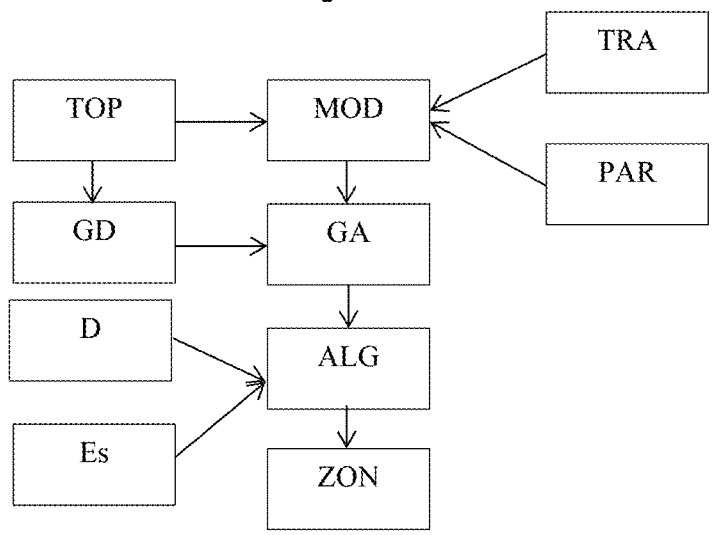
FIG. 2 illustrates the steps of the method according to a second embodiment of the invention.

FIG. 2 schematically illustrates by way of non limitative example the steps of the method according to a second embodiment of the invention. In addition to the steps described in connection with FIG. 1, the method comprises the following optional steps:

determining the road network topology (TOP), the road network topology can be used for construction of the dynamic model (MOD) and for construction of the line graph (GA);

determining the road traffic (TRA), traffic determination can be used for construction of the dynamic model (MOD) and for construction of the line graph (GA);

determining the intrinsic parameters of the vehicle (PAR), these parameters can be used for construction of the dynamic model (MOD); and constructing a directed graph (GD) of the road network, the directed graph (GD) can be obtained using the road network topology (TOP) and it can be used for construction of the line graph (GA).

The steps of determining the road network topology (TOP), the road traffic (TRA) and the intrinsic parameters of the vehicle (PAR) are independent. It is therefore possible to carry out only part of these steps.

All the steps of the method, including their variants shown in FIG. 2, are described below.

1) Position and Amount of Stored Energy Identification

In this step, the current position is identified on the one hand. In other words, the starting point of the vehicle is identified.

The current position of the vehicle con be identified using a geolocation system (of GPS or Galileo type for example). Alternatively, the current position can be given by a user by use of an interface therewith (a smartphone, the dashboard or a geolocation system for example).

In this step, the amount of energy stored in the vehicle is identified on the other hand. The amount of energy stored in the vehicle corresponds to the remaining energy that can be used by the vehicle. It can be the total amount of remaining energy. Alternatively, the user or the designer of the vehicle can define an energy threshold to be maintained (a minimum safety level for example) and, in this case, the amount of stored energy corresponds to the difference between the remaining energy and the energy threshold to be maintained.

For an electric vehicle, the amount of stored energy can correspond to the state of charge (SOC) of the battery of the vehicle. The state of charge can be measured by any known mechanism or method.

For a combustion vehicle, the amount of stored energy can correspond to the amount of fuel in the tank of the vehicle. The amount of fuel can be measured by any known mechanism or method.

For a hybrid vehicle, the amount of stored energy can correspond to a conversion to the same unit of energy of the state of charge (SOC) of the battery and of the amount of fuel in the vehicle. The state of charge and the amount of fuel can be measured by any known mechanism or method.

2) Vehicle Dynamic Model Construction

In this step, a dynamic model of the vehicle is constructed. What is referred to as dynamic model of the vehicle is a model connecting the energy consumption of the vehicle to the speed and acceleration of the vehicle. The dynamic model of the vehicle can be constructed using the fundamental principle of dynamics, associated with an engine energy model.

According to an embodiment of the invention (see the step of determining the intrinsic parameters of the vehicle of FIG. 2), the model can be constructed from macroscopic parameters of the vehicle, for example: vehicle engine power, vehicle mass, maximum power, maximum speed, transmission type, aerodynamic parameters, etc. Thus, the dynamic model is representative of the vehicle and it takes account of its specific characteristics.

According to a variant embodiment, the macroscopic parameters can be obtained from a database that lists the various vehicles in service. For example, the macroscopic parameters can be obtained by entering the registration number of the vehicle, the database associating the plate number with the design thereof (make, model, engine power, etc.) and comprising the macroscopic parameters of the vehicle.

Alternatively, the macroscopic parameters can be manufacturer data provided by the user, in particular by an interface (a smartphone, the dashboard or a geolocation system for example).

The dynamic model of the vehicle can also depend on road parameters such as the slope of the road. Such data can be obtained from a topology (see the topology determination step of FIG. 2) or from a map of the road network.

The dynamic model of the vehicle takes into account the dynamics of the vehicle. It can be constructed from the application of the fundamental principle of the vehicle dynamics applied to the longitudinal axis thereof, and it can be written as follows:

$$m\frac{dv(t)}{dt} = F_w - F_{aero} - F_{friction} - F_{slope}$$

where m is the mass of the vehicle, v(t) the speed thereof, $F_w$ the force on the wheel, $F_{aero}$ the aerodynamic force, $F_{friction}$ the rolling resistance force and $F_{slope}$ the gravitational force. The model can thus be rewritten as follows:

$$\begin{cases} \dot{x}(t) = v(t) \\ m\dot{v}(t) = F_w - \frac{1}{2}\rho_a A_f c_d v(t)^2 - mgc_r - mg\sin(\alpha(x)) \end{cases}$$

where $\rho_a$ is the air density, $A_f$ is the frontal area of the vehicle, $c_d$ is the aerodynamic drag coefficient, $c_r$ is the rolling resistance coefficient, $\alpha(x)$ is the slope of the road as a function of the position and g is the gravitational acceleration. The sum of the aerodynamic and rolling losses is generally approximated with a second-order polynomial as a function of speed v:

$$F_{res} = F_{aero} + F_{friction} = a_2 v(t)^2 + a_1 v(t) + a_0$$

where parameters $a_0$, $a_1$ and $a_2$ can be identified for the vehicle considered from a standard test referred to as coast down test.

Therefore, the force on the wheel can be expressed as follows:

$$F_w = m\dot{v}(t) + a_2 v(t)^2 + a_1 v(t) + a_0 + mg \sin(\alpha(x))$$

Hereafter, the dynamic model of the vehicle is described for a non-limitative embodiment of an electric vehicle. The electric vehicle comprises at least one electric machine, at least one electric energy storage (such as a battery) for powering the electric motor or for being powered by the electric machine (in case of regenerative braking), and energy recovery, notably regenerative braking. However, the model is adaptable to any type of engine (thermal, hybrid, electric).

The torque requested from the electric machine to achieve the requested force on the wheel is defined as follows:

$$T_m = \begin{cases} \dfrac{F_w r}{\rho_t \eta_t}, & \text{if } F_w \geq 0 \\ \dfrac{F_w r \eta_t}{\rho_t}, & \text{if } F_w < 0 \end{cases}$$

where r is the radius of the wheel, $\rho_t$ and $\eta_t$ are the transmission ratio and the transmission efficiency. An electric machine is generally a reversible machine, therefore it behaves like a motor when $T_m$ is positive and like a generator (energy recovery) when $T_m$ is negative. The torque generated by the electric machine is saturated by $T_{m,max}$ and $T_{m,min}$. In particular, during braking phases, if the engine torque is less negative than saturation value $T_{m,min}$, then the vehicle is slowed down only by the regenerative braking system. Otherwise, the mechanical brake comes into operation, thus adding its action to the regenerative braking.

The power available at the engine shaft, in the presence of a regenerative braking system, can be defined as follows:

$$P_m = \begin{cases} T_{m,max} \omega(t), & \text{if } T_m \geq T_{m,max} \\ T_m \omega(t), & \text{if } T_{m,min} < T_m < T_{m,max} \\ T_{m,min} \omega(t), & \text{if } T_m \leq T_{m,min} \end{cases}$$

where $\omega_t$ is the engine speed defined as:

$$\omega(t) = \frac{v(t)\rho_t}{r}$$

The power demand at the battery is expressed as follows:

$$P_b = \begin{cases} \dfrac{P_m}{\eta_b}, & \text{if } P_m \geq 0 \\ P_m \eta_b, & \text{if } P_m < 0 \end{cases}$$

where $\eta_b$ is the aggregate efficiency of the electric traction chain (Inverter, battery, etc.).

According to an embodiment of the invention, the precision of the model and of the estimation of the energy consumption of a journey can be improved by taking account of the power demand of at least one auxiliary system in the dynamic model of the vehicle. Indeed, the power requested by the driver for comfort purposes, notably for passenger compartment heating or air conditioning, is particularly costly in terms of energy consumption, notably for an electric vehicle where heating can have a very strong impact on the range thereof. The term relative to the power requested by the auxiliaries can be expressed as a function of the ambient temperature:

$$P_{aux} = K(T_{amb})$$

Figure 4:
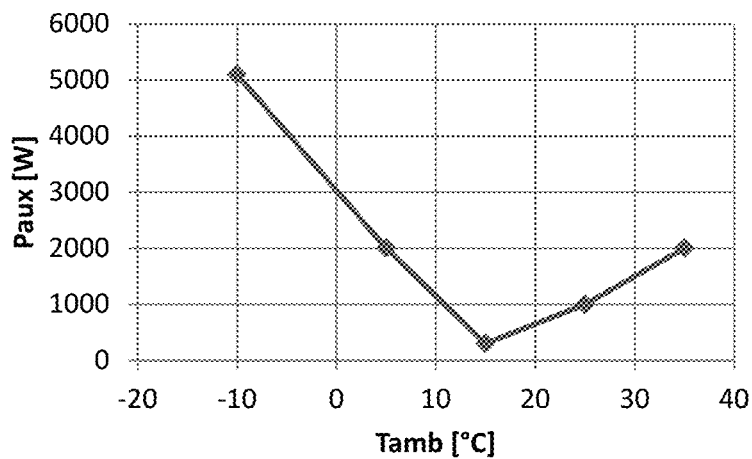
FIG. 4 is a curve illustrating the power request of an auxiliary system according to the outside temperature.

A non-limitative example of this function relating auxiliary power $P_{aux}$ to ambient temperature $T_{amb}$ is illustrated in FIG. 4. For the example illustrated, the function is a piecewise function, decreasing for low temperatures (passenger compartment heating), then increasing for higher temperatures (air conditioning).

Thus, for this embodiment, the energy consumption at the battery over a time horizon T can be defined as:

$$E_b = \int_0^T P_b + P_{aux} dt$$

The model described above requires an instantaneous speed signal. This information is not available a priori on the road segments (road portions of the road network) for which the only information available are average speeds.

According to the invention, an average speed is first considered for each road segment, then the vehicle acceleration to reach this average speed from the previous segment is considered. Preferably, the average speed can be obtained from information on the road traffic on the road network.

According to a variant, the average speed on a segment can be obtained in real time through communication with online data services that acquire real-time information on the traffic on the road network. This optional traffic determination step is described for the embodiment of FIG. 2.

Alternatively, the average speed can be stored by historical data storage that store traffic data relative to the road network, notably for different days, different times, etc.

Thus, if the average speed $\bar{v}$ due to the traffic on a road segment is assumed to be known, the model described above can be modified in order to assess the energy consumption of the vehicle for travelling the road segment considered. Speed $v(t)$ is subsequently replaced by the average traffic speed $\bar{v}$ in the dynamic model. It is thus assumed that all the vehicles on road segment i run at speed $\bar{v}_i$. The expression of the force on the wheel is therefore modified for each road segment i:

$$\bar{F}_{w,i} = a_2 \bar{v}_i^2 + a_1 \bar{v}_i + a_0 + mg \sin(\alpha_i(x))$$

where the acceleration term disappears. The engine torque becomes:

$$\bar{T}_{m,i} = \begin{cases} \dfrac{\bar{F}_{w,i} r}{\rho_t \eta_t}, & \text{if } \bar{F}_{w,i} \geq 0 \\ \dfrac{\bar{F}_{w,i} r \eta_t}{\rho_t}, & \text{if } \bar{F}_{w,i} < 0 \end{cases}$$

The engine speed is also constant over time since a constant speed $\bar{v}_i$ is assumed:

$$\overline{\omega}_i = \frac{\overline{v}_i \rho_t}{r}$$

The mechanical power available at the electric machine is rewritten as follows:

$$\overline{P}_{m,i} = \begin{cases} T_{m,max} \cdot \overline{\omega}_i, & \text{if } \overline{T}_{m,i} \geq T_{m,max} \\ \overline{T}_{m,i} \cdot \overline{\omega}_i, & \text{if } T_{m,min} < \overline{T}_{m,i} < T_{m,max} \\ T_{m,min} \cdot \overline{\omega}_i, & \text{if } \overline{T}_{m,i} \leq T_{m,min} \end{cases}$$

It is assumed hereafter that the torque saturation values are independent of the engine speed. However, other embodiments are valid, notably the maximum and minimum torques can depend on the engine speed.

The power request from the battery of the electric vehicle can be defined as follows:

$$\overline{P}_{b,i} = \begin{cases} \dfrac{\overline{P}_{m,i}}{\eta_b}, & \text{if } \overline{P}_{m,i} \geq 0 \\ \overline{P}_{m,i} \eta_b, & \text{if } \overline{P}_{m,i} < 0 \end{cases}$$

The energy consumption of the battery thus is:

$$\overline{E}_{b,i} = (\overline{P}_{b,i} + P_{aux}) T_i$$

where $T_i = l_i/\overline{v}_i$ is the travel time on road segment i if the vehicle runs at the average traffic speed $\overline{v}_i$.

Using the average speed in energy consumption models is a standard approach in the prior art. The method according to the invention accounts for the acceleration in the dynamic model of the vehicle for a more precise and reliable assessment of the true consumption. To take acceleration phenomena into account, the travel over each road segment is divided into two phases which are: a phase of constant cruising speed $\overline{v}_i$ and a speed variation (that is acceleration or deceleration) phase for switching from speed $\overline{v}_{i-1}$, that is the average speed of the previous segment, to speed iv, that is the average speed of the current segment. Preferably, a constant acceleration (or deceleration) is considered to reach speed $\overline{v}_i$. Therefore, even if the available macroscopic information does not allow knowing the temporal information, the spatial acceleration occurring at the interface between two road segments is considered. The energy consumption $E_{jump,i}$ associated with the speed variation between two road segments is defined as follows:

$$E_{jump,i} = \int_0^{t_{jump,i}} (\tilde{P}_{b,i} + P_{aux}) dt$$

with $\tilde{P}_{b,i}$ being the power demand at the battery for the acceleration phase to shift from speed $\overline{v}_{i-1}$ to speed $\overline{v}_i$.

Such a power demand at the battery can be obtained, as seen above, from a force on the interface wheel defined as:

$$\tilde{F}_w = m \cdot a + a_2 v(t)^2 + a_1 v(t) + a_0$$

where the time-varying speed v(t) in each transient can here be linearly modeled as follows:

$$v(t) = \overline{v}_{i-1} + \text{sign}(\overline{v}_i - \overline{v}_{i-1}) \cdot a \cdot t$$

where $\overline{v}_{i-1}$ is the speed on the upstream segment, $\overline{v}_i$ is the speed on the downstream segment and a is the constant acceleration for achieving the speed change. The speed variation is thus achieved as follows:

$$t_{jump,i} = \frac{\overline{v}_i - \overline{v}_{i-1}}{\text{sign}(\overline{v}_i - \overline{v}_{i-1}) \cdot a}$$

The total energy consumption on segment i is thus defined:

$$E_{b,i} = \overline{E}_{b,i} + E_{jump,i}$$

Taking the interface accelerations into account improves the precision of the energy assessment, and therefore the precision and the reliability of the reachable areas determination.

However, the a priori available information is not always complete or updated. Notably, it is not probable to have precise information on the average traffic speeds for secondary roads. It is therefore possible to have long road portions for which the traffic speed is simply a constant nominal value. In this case, taking into account only the data relative to the road network would assume that there is no acceleration, which would generate big energy consumption assessment errors. That is why the invention also allows to supplementing the road network-related data by integrating the speed perturbations induced by critical elements of the road infrastructure, notably traffic lights, intersections and bends. For example, if a traffic light is known to be located at the interface between two segments, its impact is taken into account in the consumption assessment, by considering the speed variation between the two segments.

Taking account of these accelerations not only allows obtaining more realistic and precise energy costs, but also avoiding negative loops in the routing graph modeling the road network. Indeed, the negative loop represents a sequence of road segments having the same start and end point with a negative total cost. In the specific case of a weighted graph with energy weights, this represents a situation of infinite energy recovery when travelling the loop continuously, which s in actual fact impossible. This criticality is easily verified when considering electric vehicles and if the consumption assessment for a road segment and neighboring segments does not take into account important elements such as the slope and/or the accelerations for transiting from one segment to another. The presence of negative loops in the routing graph prevents finding a route that globally minimizes the consumption because the search algorithm would converge trivially on these loops to reduce the consumption.

According to an embodiment of the invention, the speed variation between the two segments can be modeled as two transients with the first one for changing from speed $\overline{v}_{i-1}$ to 0 (for stopping at a traffic light for example) and the second for changing from speed 0 to speed $\overline{v}_i$. Thus, the energy consumption related to the speed variation can be described as the sum of two contributions:

$$E_{jump,i} = \int_0^{t_{jump,i}} (\tilde{P}_{b1,i} + P_{aux}) dt + \int_0^{t_{jump2,i}} (\tilde{P}_{b2,i} + P_{aux}) dt$$

where the speed variation in the first term is modeled as follows:

$$v_1(t) = \overline{v}_{i-1} - a \cdot t$$

and the time required for the first variation:

$$t_{jump1,i} = \bar{v}_{i-1}/a$$

Similarly, the speed variation in the second term is modeled as follows:

$$v_2(t) = a \cdot t$$

and the time required for this variation:

$$t_{jump2,i} = \bar{v}_i/a$$

Therefore, according to the invention, the dynamic model of the vehicle can be written (for any type of vehicle):

$$E_i = \bar{P}_i T_i + \int_0^{t_{jump,i}} \tilde{P}_i dt$$

with $E_i$ being the energy consumption on segment i, $\bar{P}_i$ being the power requested from the energy storage system of the vehicle (fuel tank, battery, etc.) when the vehicle is considered to be at constant speed on segment i, $T_i$ being the time during which the vehicle is considered to be at constant speed on segment i, $\tilde{P}_i$ being the power requested from the energy storage system of the vehicle when the vehicle is considered to have a speed variation (speed variation between segment i−1 and segment i), and $t_{jump,i}$ being the time required for achieving the speed variation. The first term of the model corresponds to the energy consumption on the segment due to the average speed and the second term corresponds to the energy consumption due to the speed variation for reaching the average speed.

For the embodiment taking into account the power demand of at least one auxiliary system, the dynamic model of the vehicle can be written as follows (for any type of vehicle):

$$E_i = (\bar{P}_i + P_{aux})T_i + \int_0^{t_{jump,i}} (\tilde{P}_i + P_{aux}) dt$$

with $E_i$ being the energy consumption on segment i, $\bar{P}_i$ being the power requested from the energy storage system of the vehicle (fuel tank, battery, etc.) when the vehicle is considered to be at constant speed on segment i, $P_{aux}$ being the power demand of at least one auxiliary system, $T_i$ being the time during which the vehicle is considered to be at constant speed on segment i, $\tilde{P}_i$ being the power requested from the energy storage system of the vehicle when the vehicle is considered to have a speed variation (speed variation between segment i−1 and segment i), and $t_{jump,i}$ being the time required for achieving the speed variation. The first term of the model corresponds to the energy consumption on the segment due to the average speed and the second term corresponds to the energy consumption due to the speed variation for reaching the average speed.

It is noted that, for an electric vehicle, the energy consumption can be negative. Indeed, braking may allow energy to be recovered in the battery.

3) Line Graph Construction

In this step, a line graph of the road network is constructed. In graph theory, a line graph of a graph G (the road network in the present case) is understood to be a graph representing the adjacency relation between the edges of G. The line graph of a graph can be defined as follows: each vertex of the line graph representing an edge (also called arc) of graph G, and two vertices of the line graph are adjacent (that is connected) if and only if the corresponding edges share a common end in graph G. Thus, the line graph is an equivalent representation of the road network where all the maneuvers are correctly decoupled and distinguished, which enables precise determination of the energy costs. Using a line graph enables reduction of the memory required for determination of the reachable area in relation to the use of a directed graph. Indeed, the data structure is less complex for a line graph.

For the methods according to the prior art, the road network can be modeled as a directed graph. Let graph G=(V,A), where V is the set of all nodes and A is the set of all connections between the nodes, that is the arcs. Let w: A→W be a function assigning a weight to each arc of the graph. In the graphs used for conventional routing, the weight associated with the arcs represents either the length or the travel time. For the method according to the invention, each weight represents the energy consumption for travelling through the arc.

According to an embodiment of the invention, the objective of this work can be to design a strategy based solely on statistical and topological information on the road network, without using any real driving data. This type of information, which is at least one of being often incomplete and imprecise, is generally available on commercial web map services (online services). For each arc i∈A of the graph, it is possible to know the length, the average speed of the current traffic $v_i$ that depends on the time of the day, and the slope of $\alpha_i(x)$ that varies within the arc considered as a function of the position. Furthermore, some web map services provide a degree of importance for each road segment, specifying whether it is a highway, a major urban road or a secondary urban street. Moreover, the position of some traffic lights can be available.

By use of the method according to the invention, it is possible to considerably improve the precision of assessment of the energy consumption and of the navigation, considering the accelerations induced by the various speeds in at least one of the road segments and known infrastructure elements.

Taking into account the interface accelerations between adjacent arcs poses a problem for modeling the road network as a directed graph (prior art) and particularly for assigning weights to each arc. In particular, each node of the graph with two or more incoming arcs is critical because $v_{i-1}$ and therefore $E_{jump,i}$ are not unique. Of course, this prevents an unambiguous assignment of weights to the arcs. Therefore, directed graph G is not adequate for the proposed energy consumption model. This ambiguity can be solved using the line graph as the graph for the proposed navigation strategy.

According to an embodiment of the invention, the line graph of the road network is constructed by carrying out the following steps:

i) constructing a directed graph of the road network with nodes and arcs (also referred to as segments or edges), the nodes of the directed graph corresponding to the intersections of the road network and the arcs of the directed graph corresponding to the roads connecting the intersections; and ii) constructing the line graph of the road network with nodes and arcs, the nodes of the line graph corresponding to the arcs of the directed graph and the arcs of the line graph corresponding to adjacency of the arcs of the directed graph.

Figure 3:
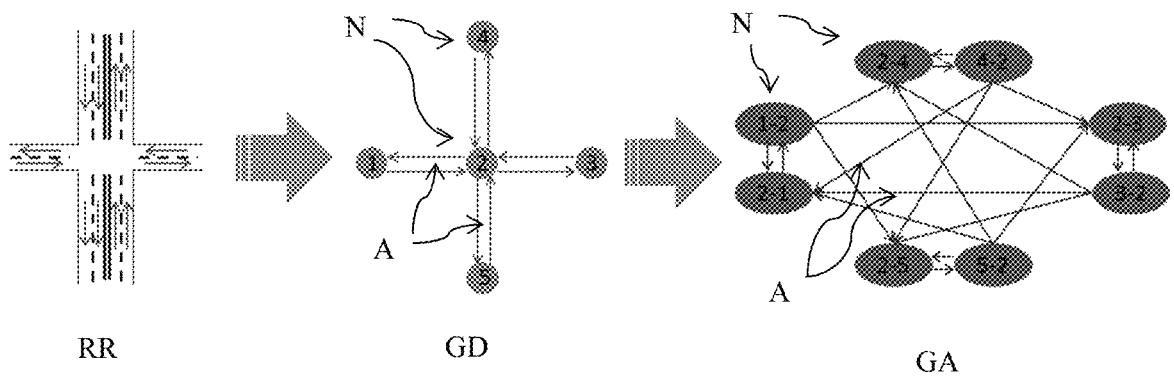
FIG. 3 illustrates the construction of a line graph according to an embodiment of the invention.

FIG. 3 schematically illustrates by way of non-limitative example these line graph construction steps. Road network RR concerns an intersection between two roads. The first step constructs directed graph GD from the road network. Directed graph GD comprises five nodes N corresponding to the four ends of the roads and to the intersection thereof. Furthermore, directed graph GD comprises eight arcs A connecting the nodes and corresponding to the roads of road network RR. The second step constructs line graph GA from directed graph GD. Line graph GA comprises eight nodes N corresponding to each arc of directed graph GD. Furthermore, line graph GA comprises twenty arcs A corresponding to the adjacency of nodes N of directed graph GD.

4) Determining the Energy Consumed for Each Arc of the Line Graph

In this step, a weight is determined at each arc of the line graph. The weight corresponds to the energy used by the vehicle on this arc. The dynamic model of the vehicle is therefore applied for each arc of the line graph, by considering the average speed of the vehicle on this arc, and the acceleration of the vehicle for reaching the average speed. It is thus possible to know with precision the energy consumed on an arc, which allows to determine on optimal route in terms of energy expenditure.

Using line graph L(G) as the routing graph allows assigning in a unique way the weight to each arc of the graph, by decoupling all the possible maneuvers modeled in the original graph G. Each arc of the line graph represents a path over two adjacent arcs of directed graph G. and therefore each arc of line graph L(G) contains information on an arc of the original directed graph G and also on its upstream arc.

This intrinsic property of the line graph not only allows correctly considering the interface accelerations between adjacent arcs, it also allows model being in a more realistic manner the impact of the infrastructure on the energy consumption. More specifically, according to a proposed modeling approach, the energy term that takes account of the stops/restarts induced by the infrastructure is defined as:

$$E_{jump,i} = \int_0^{t_{jump,i}} (\tilde{P}_{b1,i} + P_{aux})dt + \int_0^{t_{jump2,i}} (\tilde{P}_{b2,i} + P_{aux})dt$$

This consideration can be introduced only on the arcs of the line graph that represent the following situations:
- a traffic light or a stop sign at the junction between an upstream lower priority road and a downstream higher priority road. The green waves on the major roads are therefore not penalized
- the upstream and downstream arcs are connected by a maneuver with a turning angle wider than an adjustable threshold.

The line graph $L(G)=(V^*, A^*)$ of a graph G has the arcs of graph G as its nodes, therefore $i \in A$ but also $i \in V^*$. Therefore, let $w^*: A^* \to W^*$ be a new function of weight assignment to the arcs of the line graph. The weight for each arc $k \in A^*$ is defined as follows:

$$W_k^* = \begin{cases} \overline{E}_{b,i} + E_{jump,i}, & \text{if } i-1 \in V^* \text{ has incoming arcs} \\ \overline{E}_{b,i} + E_{jump,i} + \overline{E}_{b,i-1}, & \text{if } i-1 \in V^* \text{ has no incoming arcs} \end{cases}$$

It is to be noted that, for an electric vehicle, the energy on an arc can be negative. Therefore, the weight of this arc of the line graph can be negative. Indeed, braking can allow energy to be recovered in the battery.

5) Reachable Area Determination

In this step, at least one area of the road network that is reachable by the vehicle with the amount of stored energy is determined, starting from the identified position. This reachable area is determined by a method that minimizes the energy consumption. The reachable area can be defined by a graphical representation on a road map. For example, the graphical representation can be all the points (positions) of the road network that the vehicle can reach, and these points can be inscribed in a polygon. The reachable area may not be a full area with non-reachable critical areas (or points) possibly existing within the perimeter delimiting the area, such as critical areas (or points) corresponding for example to hills, mountains, etc. Thus, the reachable area can be a polygon within which the critical areas are excluded.

This step is carried out by taking into account the energy consumption on each arc of the line graph. Determination of the reachable area is performed by a shortest path algorithm. The shortest path algorithm determines the reachable area on the line graph by taking account of the energy consumption determined for each arc. Preferably, the optimum algorithm that computes the shortest path in a directed and weighted graph from a source vertex is the Bellman-Ford algorithm. The selected algorithm is suited to take account of a negative weight (i.e. energy consumed) on at least one arc of the line graph, unlike others such as Dijkstra's algorithm which, although faster. Is not optimal in the presence of arcs with negative weights. Using a shortest path algorithm allows determining the widest reachable area possible (In a less conservative manner than the methods of the prior art). Thus, the range of the vehicle is increased.

Once the algorithm reproduces the optimal sequence of nodes of the line graph, this result can be readily transferred to the original graph by generating all of the nodes of the original graph surrounding the origin of the displacement, that is the reachable area.

According to an embodiment of the invention, the method can comprise a stage of offline recording of the global historical information on the traffic conditions of different days of a week selected at different times of the day. Real-time adaptation is implemented only after the driver selects the starting point and the departure time.

An optional step in the method according to the invention can display the reachable area that is determined, for example on the screen of a geolocation system (GPS, Galileo), of a smartphone, on the dashboard of the vehicle, on a website, etc. It is thus possible to inform the user or any other person (such as a vehicle fleet manager or a road infrastructure manager for example) of the reachable area. It is also possible to display the consumed energy for all the points of the reachable area.

Displaying the reachable area can consist in representing on a map of the road network all the points (positions) that can be reached by the vehicle.

Furthermore, the method according to the invention can be used to determine the reachable area while considering a return journey. Indeed, a particularly attractive extension of the method according to the invention, in the case of electric vehicles, can calculate a radius of action when return journeys are planned. For an electric vehicle, it is interesting to not only know if it is possible or not to reach a destination, but also the capacity to return to the starting point to recharge.

This result can be obtained using the shortest path algorithm, for example the Bellman-Ford algorithm, on the "reverse" line graph. This graph is simply obtained by reversing the direction of the arcs of the original line graph. The shortest path algorithm (Bellman-Ford) can then be executed on this graph still having the same origin as the source node. This allows obtaining all the optimal paths to reach the starting position from all the other nodes of the line graph.

According to an embodiment of the invention, the energy consumption of the vehicle is assessed from the origin to at least one point of the reachable area. Preferably, the energy consumption is determined for all the points of the reachable area. Indeed, using a dynamic model and a shortest path algorithm, in particular the Bellman-Ford algorithm, allows assessing the energy consumption from the origin to all the destinations within the reachable area. Therefore, in the reachable area, it is possible to know how the energy consumption varies according to different possible destinations. It is thus possible to optimize the management of the battery charge of the vehicle according to the destination and to the reachable area. According to a variant of this embodiment, the estimated energy consumption can also be displayed, for example on a screen of a geolcation system (GPS, Galileo), of a smartphone, on the dashboard of the vehicle, on a website, etc.

According to an embodiment of the invention, the method of the invention can be used as a tool allowing calibration of a simplified approach of isodistance type. The isodistance approach is a known approach that determines a distance that can be traveled by the vehicle according to the amount of stored energy and in applies this distance to the starting point of the vehicle. This isodistance approach thus determines a substantially circular area of constant radius around the starting point. Such an application enables operation with very limited resources, both in terms of map data queries and of computing power.

With such an approach, the present invention is used once to design the simplified mode that will subsequently be used independently. The invention then allows calibration of the mileage range corresponding to a given vehicle and to a given geographic area. After this offline calibration of the isodistance algorithm with the method according to the invention, the calibrated isodistance algorithm is applied online to determine the reachable areas. In this application, the resulting range is no longer optimal but it corresponds to the worst case of the optimal approach it can therefore have the allowable maximum value with an isodistance approach, that is more reliable and more precise than an isodstance approach without calibration.

The method according to the invention can be used for motor vehicles. It can however be used in the field of road transport, two-wheelers, etc.

Furthermore, the method according to the invention relates to a method of managing a battery of an electric or hybrid vehicle driving on a road network. Management of the battery can comprise the following steps:

determining at least one area of the road network reachable by the vehicle using the determination method according to one of the variants described above, according to the starting position and to the amount of energy stored in the battery; and managing at least one of the charging of the battery according to the reachable area.

Managing at least one of the use and charging of the battery can determine, within the reachable area, a destination for the vehicle. The destination can be the final destination of the vehicle or a charging station for the vehicle, if the final destination desired by the user is outside the reachable area. Alternatively, management of at least one of the use and the charging of the battery can at least delay and bring the journey forward so that the battery is completely charged. For example, if the final destination desired by the user is not within the reachable area, the user can charge the battery until his desired final destination is within the reachable area. Alternatively, if the user finds that he cannot make the desired journey, he can bring the journey at least one forward and modify it to charge the battery as soon as possible.

For the embodiment where the energy consumption is determined for the reachable area, at least one of management of use and charging of the battery can be achieved according to the determined energy consumption to optimize this management.

The precision and the reliability of the reachable area determination method improves the efficiency of the vehicle battery management in relation to methods of the prior art. Thus, the vehicle battery range is increased.

Furthermore, the invention relates to a computer program product downloadable from a communication network and/or recorded on a computer-readable medium and/or processor or server executable. This program comprises program code instructions for implementing the method as described above, when the program is executed on a computer or on a mobile phone, or any similar system.

APPLICATION EXAMPLES

The features and advantages of the method according to the invention will be clear from reading the application examples hereafter.

Example 1

This Example 1 relates to a comparison of the method according to the invention with a method of the prior art of isodistance type.

It is to be noted that the isodistance approach is a known approach that consists in determining a distance that can be traveled by the vehicle according to the amount of stored energy and in applies this distance to the starting point of the vehicle. The isodistance approach thus determines a substantially circular area of constant radius around the starting point.

For this comparison, a common starting point and an amount of remaining energy of 1 kWh are estimated. For the isodistance approach according to the prior art, this amount of remaining energy corresponds to a distance of 5.5 km to be covered.

Figure 5:
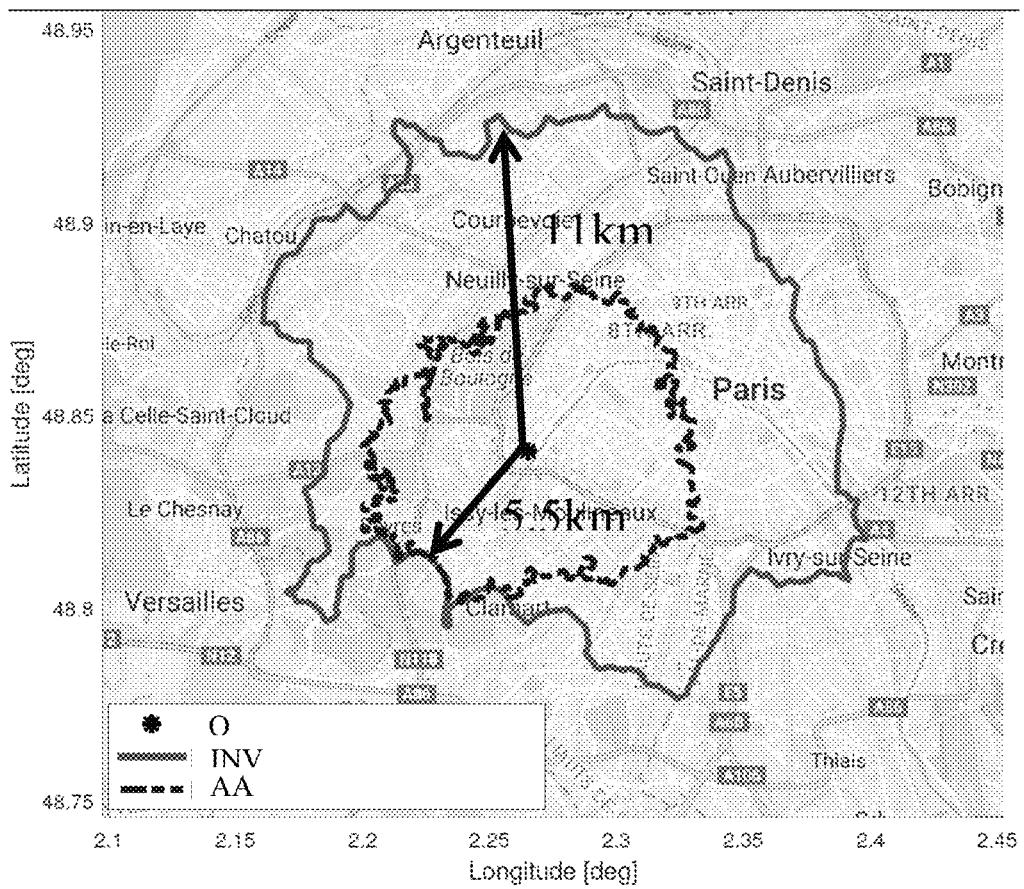
FIG. 5 is a first example of a map obtained with the method according to an embodiment of the invention and with a method according to the prior art.

FIG. 5 illustrates, on a map of the Paris region, the results obtained for the isodistance method AA. FIG. 5 illustrates, on the same map, the area reachable from origin O for the method according to the invention INV.

Thus, the comparison between the energy approach of the present invention INV and the state of the art AA allows showing, on the one hand, that the method according to the invention allows to provide a prediction that it is possible to reach points 11 km away from the origin, i.e. twice the distance predicted by the method of the prior art. On the other hand, the polygon obtained with the energy approach (according to the invention) is not as symmetrical as that of the isodistance approach (according to the prior art), which shows the influence of all the factors impacting the energy consumption (slope, traffic, road signs, etc.) that are not taken into account in the approach of the prior art. Thus, the method according to the invention allows determining a reliable energy radius matching the reality of the road network.

Example 2

This Example 2 also concerns a comparison of the method according to the invention with a method of isodistance type according to the prior art.

For this comparison, a common starting point and an amount of remaining energy of 1 kWh are estimated. For the isodistance approach according to the prior art, this amount of remaining energy corresponds to a distance of 5.5 km to be covered.

Figure 6:
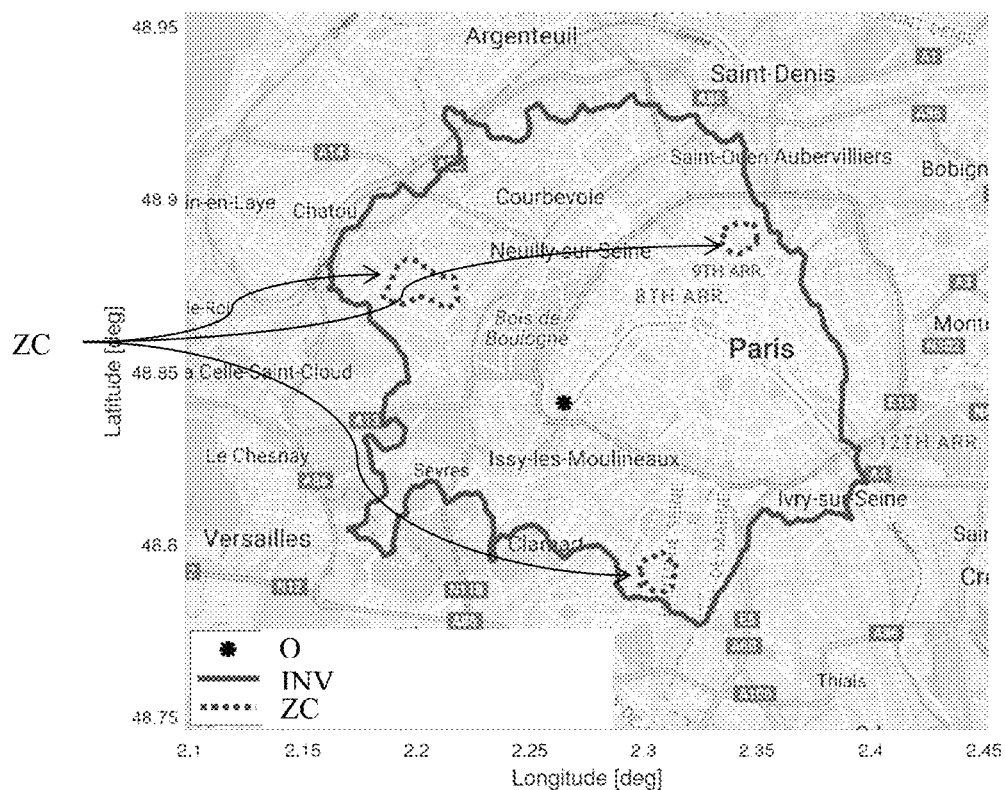
FIG. 6 is a second example of a map obtained with the method according to an embodiment of the invention.

FIG. 6 illustrates, on a map of the Paris region, the points reachable from the origin for the method of the invention INV. It can be noted that critical areas ZC are not reachable by the vehicle. These points correspond to hills requiring an additional amount of energy.

Example 3

This Example 3 relates to a comparison of the method according to the invention for a one-way journey and a return journey.

For this comparison, a common starting point and an amount of remaining energy of 1 kWh are estimated for the one-way journey, and an amount of remaining energy of 2 kWh is estimated for a return journey.

Figure 7:
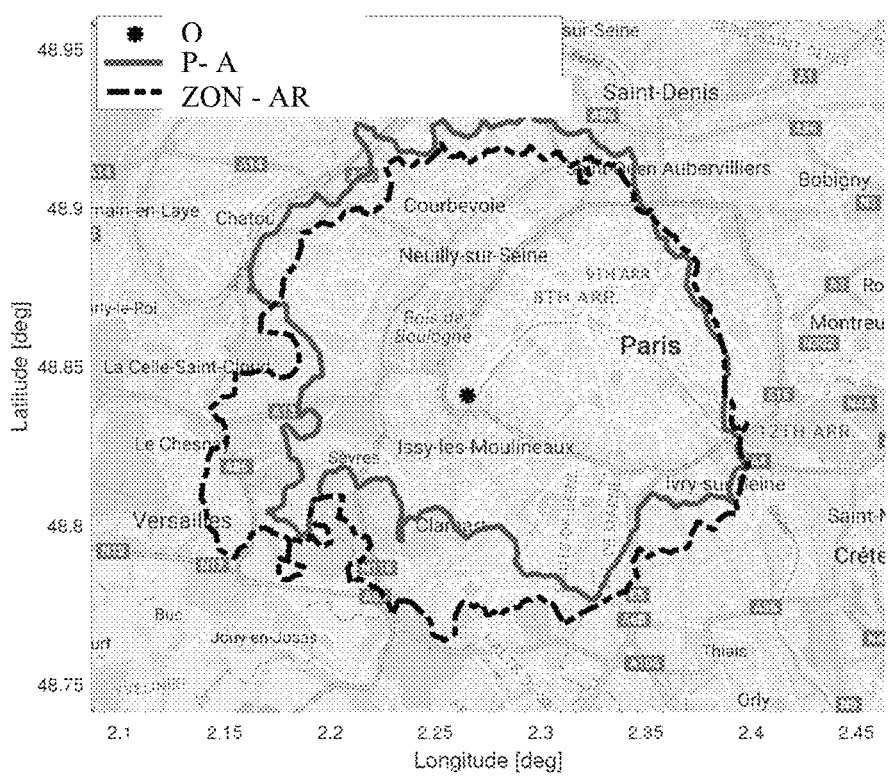
FIG. 7 is a third example of a map obtained with the method according to an embodiment of the invention, respectively for a one-way journey and for a return journey.

FIG. 7 illustrates, on a map of the Paris region, the reachable points P-A for a one-way journey from origin O, and the limits of the reachable area ZON-AR for the return journey from origin O.

It can be noted that these two areas defined by points P-A and ZON-AR are not identical. In the case of a return journey, the symmetry of the reachable area in relation to the point of origin is increased because the high energy expenditure in one direction (due to an elevation gain for example) is partly recovered during the journey in the opposite direction. Besides, the non-reachable points in the case of a one-way journey become allowable considering the return radius of action.

Example 4

This Example 4 affords the advantages of the method according to the invention in terms of memory.

As regards the complexity of the data structure and of the algorithm, modeling in form of line graph and using a list of arcs to represent this graph affords advantages.

In terms of data structure complexity, for a given road network of n nodes and m arcs, an adjacency list (as used for example in US published patent application 2014/0,278, 038) representing the line graph of the network contains V nodes and E arcs:

$$V = m$$

$$E = \sum_{i=1}^{n} ID(n_i) * OD(n_i)$$

where $n_i$ is the node i, $ID(n_i)$ is the number of incoming arcs in node i. $OD(n_i)$ is the number of outgoing arcs of node i.

The memory storage for this data structure is V+E.

The invention presented here, for a given road network of n nodes and m arcs, stores a list of arcs of dimension E:

$$E = \sum_{i=1}^{n} ID(n_i) * OD(n_i)$$

The memory storage for this data structure is equal to E, and therefore is lower than that of the data structure of the prior art.

In terms of algorithm complexity, the Bellman-Ford shortest path algorithm has a complexity equal to $O(V*E)$ in both cases. With the modification proposed in the invention, the algorithm converges with a complexity $O(k*E)$ or $k \ll V$.

Figure 8A:
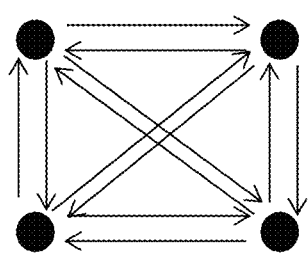
FIGS. 8a and 8b Illustrate two road network examples.
Figure 8B:
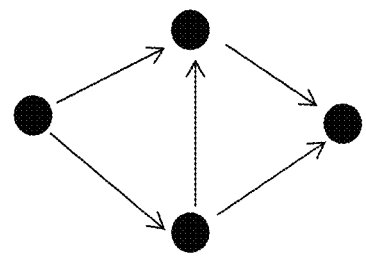

In order to better understand the differences, two examples of road networks are shown in FIGS. 8a and 8b.

For the example of FIG. 8a:

A number of nodes n is equal to 4 and a number of arcs m is equal to $n(n-1)=12$.

The method according to the invention manages a data structure of size $n(n-1)^2=36$, while in the case of an arc adjacency list (prior art), the size of the structure is $n(n-1)+n(n-1)^2=48$.

Therefore, the shortest path algorithm has a quadratic complexity for the method of the invention, whereas for the method according to the prior art, the complexity is of order 3.

For the example in FIG. 8b:

We have a number of nodes n equal to 4 and a number of arcs m equal to 5.

The method according to the invention manages a structure of size 4, whereas the arc adjacency list (prior art) manages a number of arcs equal to 9. Therefore, in a case where the number of maneuvers is comparable to the number of arcs of the road network, the complexity of the data structure is double for the prior art in relation to the method of the invention. Thus, the invention requires less computing resources, notably in terms of memory, and its computation time is reduced.

The invention claimed is:

1. A method of determining at least one area of a road network reachable by a vehicle driving on the road network, comprising:
    a) identifying a position of the vehicle and an amount of energy stored in the vehicle;
    b) constructing a dynamic model of the vehicle relating energy consumed by the vehicle to speed and acceleration of the vehicle, and a slope profile of the road network;
    c) constructing a line graph of the road network around the identified position of the vehicle;
    d) determining the energy consumed by the vehicle for each arc of the line graph by use of the dynamic model of the vehicle and of an average speed of the vehicle on the arcs being considered, of a slope profile on the arcs being considered and of acceleration of the vehicle to reach the average speed on the arc being considered; and
    e) determining at least one area of the road network reachable by the vehicle with the amount of energy stored in the vehicle by use of a shortest path algorithm which minimizes on the line graph the energy consumption, with the shortest path algorithm being constrained by the amount of energy stored in the vehicle.

2. A method as claimed in claim 1, wherein the average speed and the acceleration of the vehicle are determined by at least one of traffic conditions, topology and infrastructures of the road network.

3. A method as claimed in claim 2, wherein the traffic conditions are obtained in real time through communication with online data services.

4. A method as claimed in claim 3, wherein the line graph is constructed using the topology of the road network.

5. A method as claimed in claim 3, wherein the topology of the road network is determined by use of geolocation.

6. A method as claimed in claim 2, wherein the traffic conditions are stored in a historical data storage.

7. A method as claimed in claim 6, wherein the line graph is constructed using the topology of the road network.

8. A method as claimed in claim 6, wherein the topology of the road network is determined by use of geolocation.

9. A method as claimed in claim 2, wherein the line graph is constructed using the topology of the road network.

10. A method as claimed in claim 2, wherein the topology of the road network is determined by use of geolocation.

11. A method as claimed in claim 1, wherein the line graph is constructed using the topology of the road network.

12. A method as claimed in claim 11, wherein the topology of the road network is determined by use of geolocation.

13. A method as claimed in claim 1, wherein the dynamic model of the vehicle depends upon intrinsic parameters of the vehicle.

14. A method as claimed in claim 13, wherein the intrinsic parameters of the vehicle are obtained from either a database or are transmitted by a user.

15. A method as claimed in claim 1, wherein the area is displayed on either an autonomous device or on a dashboard of the vehicle.

16. A method as claimed in claim 1, wherein the dynamic model of the vehicle depends on a power request of at least one auxiliary system of the vehicle.

17. A method as claimed in claim 16, wherein the power request of at least one auxiliary system depends on outside temperature.

18. A method as claimed in claim 1, wherein the shortest path algorithm is a Bellman-Ford algorithm.

19. A method as claimed in claim 1, wherein the consumption of the vehicle is determined for at least one point of the area.

20. A method as claimed in claim 1, wherein the line graph is constructed by:
   i) constructing a directed graph of the road network with nodes and arcs, the nodes of the directed graph corresponding to the intersections of the road network, and the arcs of the directed graph corresponding to the roads connecting the intersections, and
   ii) constructing the line graph of the road network with nodes and arcs, the nodes of the line graph corresponding to the arcs of the directed graph and the arcs of the line graph corresponding to adjacency of the arcs of the directed graph.

21. A method as claimed in claim 1, wherein the vehicle is an electric vehicle and the amount of energy stored in the vehicle corresponds to the state of charge of the battery of the vehicle.

22. A method of managing a battery of a vehicle driving on a road network, comprising:
   a) identifying a position of the vehicle and an amount of energy stored in the vehicle;
   b) constructing a dynamic model of the vehicle relating energy consumed by the vehicle to speed and acceleration of the vehicle, and a slope profile of the road network;
   c) constructing a line graph of the road network around the identified position of the vehicle;
   d) determining an amount of the energy consumed by the vehicle for each arc of the line graph by use of the dynamic model of the vehicle and of an average speed of the vehicle on the arcs being considered, of a slope profile on the arcs being considered and of acceleration of the vehicle to reach the average speed on the arc being considered;
   e) determining at least one area of the road network which is reachable by the vehicle on the road network with the amount of energy stored in the vehicle by using a shortest path algorithm applied to the line graph with energy constrained by the amount of energy stored in the vehicle; and
   f) managing at least one of use and charging of the battery according to the reachable area.

23. A computer program product stored on a tangible computer-readable medium, comprising program code instructions when executed for implementing a method comprising:
   a) identifying a position of the vehicle and an amount of energy stored in the vehicle;
   b) constructing a dynamic model of the vehicle relating energy consumed by the vehicle to speed and acceleration of the vehicle, and a slope profile of the road network;
   c) constructing a line graph of the road network around the identified position of the vehicle;
   d) determining an amount of the energy consumed by the vehicle for each arc of the line graph by use of the dynamic model of the vehicle and of an average speed of the vehicle on the arcs being considered, of a slope profile on the arcs being considered and of acceleration of the vehicle to reach the average speed on the arc being considered; and
   e) determining at least one area of the road network reachable by the vehicle with the amount of energy stored in the vehicle by use of a shortest path algorithm which minimizes on the line graph the energy consumption, with the shortest path algorithm being constrained by the amount of energy stored in the vehicle.

* * * * *